(12) United States Patent
Bosch et al.

(10) Patent No.: US 6,409,814 B1
(45) Date of Patent: Jun. 25, 2002

(54) PIGMENT PREPARATIONS AND WATER-BORNE EFFECT BASE COATS PREPARED THEREWITH

(75) Inventors: Werner Bosch; Georg Antonio Cuddemi; Frank Mueller, all of Wuppertal; Marco Taschner, Sprockhoevel, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/552,602

(22) Filed: Apr. 19, 2000

(51) Int. Cl.$^7$ .............................. C09C 1/64; C09C 1/00
(52) U.S. Cl. ....................... 106/404; 106/491; 106/483; 106/490; 523/216; 427/407.1; 427/419.5
(58) Field of Search .................... 523/216; 427/407.1, 427/419.5; 106/491, 483, 490, 404

(56) References Cited

U.S. PATENT DOCUMENTS

| | | | |
|---|---|---|---|
| 4,981,885 A | 1/1991 | Engel et al. | ................. 523/409 |
| 5,332,767 A | 7/1994 | Reisser et al. | ............... 523/209 |
| 5,763,086 A | 6/1998 | Schmid et al. | |
| 5,908,669 A * | 6/1999 | Hayashi et al. | ............. 427/421 |
| 6,099,968 A * | 8/2000 | Harakawa et al. | .......... 428/414 |

FOREIGN PATENT DOCUMENTS

| | | |
|---|---|---|
| DE | 19820112 | 11/1999 |
| WO | WO 99/57204 | 11/1999 |

OTHER PUBLICATIONS

Keihl et al., Encapsulated Aluminum Pigments, *Elsevier*, 37, 179–183, 1999.

* cited by examiner

*Primary Examiner*—C. Melissa Koslow
(74) *Attorney, Agent, or Firm*—Sudhir G. Deshmukh

(57) ABSTRACT

Pigment preparations, having a solid content of 10 to 60 wt-%, obtainable by mixing together, in the presence of at least one water-miscible organic solvent, pigments coated with a silicon-oxygen-matrix with at least one resin having carboxyl groups sufficient to provide an acid value of 10 to 100 mg KOH/g resin and having an number average molecular mass of 500 to 5000, wherein the ratio of pigment to resin is in the range of 1:0.3 to 1:10, can be used for the preparation of water-borne effect base coats with shear stability.

9 Claims, No Drawings

PIGMENT PREPARATIONS AND WATER-BORNE EFFECT BASE COATS PREPARED THEREWITH

BACKGROUND OF THE INVENTION

The invention relates to pigment preparations suited for the preparation of water-borne effect base coats (i.e., base coats that provide a desired effect to the coated article, as opposed to merely providing color), a process for preparing the pigment preparations and water-borne effect base coats prepared therewith.

In a vehicle coating production line the coating supply of the spray-coating devices proceeds from coating supply reservoirs via circulation lines connected thereto. Heavy shearing strains affect the liquid coating material while it is conveyed within a circulation line. These shearing strains can lead to alterations of the effect and color shade of the coating materials, for example, water-borne effect base coats. Good effect and color shade constancy is however a key property of a suitable production line operation.

It is known from WO 99/57204 and A. Kiehl and K. Greiwe, "Encapsulated aluminum pigments", Progress in Organic Coatings 37 (1999), pages 179 to 183, that pigments coated with a silicon-oxygen-matrix are in particular suitable for preparing water-borne effect base coats having a good shear stability.

It is an object of the invention to provide pigment preparations which can be used for preparing water-borne effect base coats having an excellent shear stability with respect to effect and color shade stability.

SUMMARY OF THE INVENTION

The present invention provides pigment preparations having a solid content of 10 to 60 wt-%, which are obtainable by mixing together, in the presence of water-miscible organic solvents:
  a) pigments coated with a silicon-oxygen-matrix
  b) at least one resin having carboxyl groups sufficient to provide an acid value of 10 to 100 mg KOHJg resin and having a number average molecular mass of 500 to 5000
  c) wherein, the weight ratio of pigments to resin is in the range of 1:0.3 to 1:10.

Detailed Description of the Embodiments

The pigment preparations according to the invention contain one or more pigments, the surface of which is coated with a silicon-oxygen-matrix. The silicon-oxygen-matrix can be linked to the surface of the pigments by covalent bonds. Such pigments and their preparation are known for example from WO 99/57204, U.S. Pat. No. 5,332,767 and from A. Kiehl and K. Greiwe, "Encapsulated aluminum pigments", Progress in Organic Coatings 37 (1999), pages 179 to 183.

Pigments coated with a silicon-oxygen-matrix can be prepared by subjecting monosilanes, having at least two hydrolyzable groups, to hydrolysis and condensation in the presence of the pigments. The monosilanes having at least two hydrolyzable groups are in particular bisalkoxy, trisalkoxy and tetraalkoxy monosilanes. Preferred alkoxy substituents are C1–C4 alkoxy groups, in particular methoxy and ethoxy groups. The monosilanes having at least two hydrolyzable groups can carry, apart from the hydrolyzable groups, further non-hydrolyzable organic radicals on the silicon atom. For example alkyl groups or preferably radicals with reactive functional groups or reactive functional groups such as for example vinyl, amino, isocyanate, epoxy or in particular (meth)acryloyl groups may be present.

Examples of monosilanes to be hydrolyzed in the presence of the pigments are vinyl trimethoxysilane, aminopropyl triethoxysilane, isocyanatopropyl triethoxysilane, 3-glycidyloxypropyl trimethoxysilane, 3-(meth)acryloxypropyl trimethoxysilane, 3-(meth)acryloxypropyl triethoxysilane.

Examples of pigments, in the presence of which the hydrolysis of the monosilanes can be carried out, are metallic pigments, for example of aluminum, copper or other metals; interference pigments such as, e.g., metal oxide-coated metallic pigments, e.g., titanium dioxide- or iron oxide-coated aluminum, coated mica such as, e.g., titanium dioxide-coated mica and graphite-like effect-giving pigments, metal oxide flake or non-metal oxide flake, e.g. iron oxide flake or silicon oxide flake. Preferred are metallic pigments, in particular of aluminum. The pigments may not be pretreated, for example not passivated.

The monosilanes are hydrolyzed in the presence of the pigments. This can be carried out, as is known from U.S. Pat. No. 5,332,767, in the presence of organic solvents that are not miscible with water, while adding a small amount of water, which is required for the hydrolysis. Preferred pigments coated with a siliconoxygen-matrix are however obtained when the hydrolysis is carried out in the presence of water-miscible solvents while adding water and alkaline catalysts, for example amines, as is known from WO 99/57204 and A. Kiehl and K. Greiwe, "Encapsulated aluminum pigments", Progress in Organic Coatings 37 (1999), pages 179 to 183. After the hydrolysis, the pigments coated with a silicon-oxygen-matrix can be isolated by filtering off and drying. During the hydrolysis of the hydrolyzable groups of the monosilanes, silanol groups are formed, which condense to siloxane bridges while forming a silicon-oxygen-matrix. If for example solely silanes having four hydrolyzable groups are used, in particular tetraalkoxysilanes, the densest possible silicon-oxygen-matrix ($SiO_2$) is created. The density of the silicon-oxygen-matrix is dependent on the choice of the kind and the amount of the individual monosilanes to be hydrolyzed, for example a monosilane mixture. The lower the average number of the hydrolyzable groups of the monosilanes, the less dense is the obtained silicon-oxygen-matrix. Preferably bisalkoxy and/or trisalkoxy monosilanes, optionally in combination with tetraalkoxy silanes, are hydrolyzed in the presence of the pigments. Thereby particular preference is given to the use of bisalkoxy and/or trisalkoxy monosilanes having reactive functional groups.

The monosilanes can be added and hydrolyzed in one or more steps. In a step after the hydrolysis and condensation the reactive functionality, introduced into the silicon-oxygen-matrix, can preferably be used for the build-up of a polymer, for example a three-dimensionally cross-linked polymer. The polymer can be linked to the silicon-oxygen-matrix located on the surface of the pigment in the manner of a resin coating. Suitable functionalised organic compounds of low molecular weight can for example be converted to a polymer with the reactive groups on the silicon-oxygen-matrix by polycondensation, polyaddition or radical polymerization. Epoxy groups on the silicon-oxygen-matrix can for example be converted to a three-dimensional polymer with polyamines such as ethylene diamine and triethylene tetraamine. It is preferred to have (meth)acryloyl groups as the reactive functional groups on the siliconoxygen-matrix and to radically copolymerize these with radically polymerizable, in particular multiply olefinically unsaturated compounds, such as for example hexanediol diacrylate and trimethylolpropane tri(meth)acrylate.

Examples of commercially available aluminum pigments coated with a silicon-oxygen-matrix are the aluminum pigments characterized and sold by the company Eckart-Werke under the name "STAPA IL Hydrolan" as belonging to one product family.

The pigment preparations according to the invention contain, apart from the pigments coated with a silicon-oxygen-matrix as explained above, carboxyl-functional resin and water-miscible organic solvents.

The carboxyl-functional resin(s) possess carboxyl groups sufficient to provide an acid value of 10 to 100 mg KOH/g resin, preferably of 20 to 50 mg KOH/g resin and have a number average molecular mass of 500 to 5000, preferably of 1000 to 5000. The carboxyl groups are not neutralized. Apart from the carboxyl groups, the polymers carry no further acid groups. Examples are carboxyl-functional (meth)acrylic copolymer, polyurethane and preferably polyester resins. The carboxyl-functional polymers can have a hydroxyl value of up to 100 mg KOH/g resin solids.

Examples of water-miscible organic solvents contained in the pigment preparations are N-methylpyrrolidone, C1–C4 alcohols and, in particular, glycol ethers such as, for example, isopropyl glycol, butyl glycol, methyl diglycol, ethyl diglycol, butyl diglycol, ethyl triglycol, butyl triglycol, methoxypropanol, ethoxypropanol, propoxypropanol, butoxypropanol, methoxybutanol, propylene glycol dimethyl ether, dipropylene glycol dimethyl ether, diethylene glycol dimethyl ether, dipropylene glycol monomethyl ether.

The pigments coated with a silicon-oxygen-matrix, in particular aluminum pigments coated with a silicon-oxygen-matrix, can be used as such or in pasted form with organic solvents for the preparation of the pigment preparations. The pigment preparations can be obtained by mixing 1 part by weight of pigments coated with a silicon-oxygen-matrix with 0.3 to 10 parts by weight, preferably 0.5 to 3 parts by weight, of one or more carboxyl-functional resins in the presence of water-miscible organic solvents. Water can optionally be added in amounts of for example up to 10 wt-%, based on the amount of the water-miscible solvents. It is preferred to work without addition of water, however.

The pigments coated with a silicon-oxygen-matrix, the carboxyl-functional resins, and the water-miscible organic solvents are mixed in weight proportions, such that pigment preparations result which have a solid content of 10 to 60 wt %, preferably of 20 to 50 wt-%. The pigments coated with a silicon-oxygen-matrix can for example first be provided and homogeneously mixed with one or more water-miscible organic solvents. Optionally additives such as dispersion additives or emulgators for example can be added in amounts of up to 20 wt-%, based on the weight of the pigments coated with a silicon-oxygen-matrix. The carboxyl-functional resins, for example as a 20 to 80 wt-% solution in water-miscible organic solvents, can be added to and well mixed with the thus obtained homogeneous mixture of pigments coated with a silicon-oxygen-matrix and the organic solvents.

The pigment preparations may also contain insignificant quantities, for example up to 10 wt-%, of organic solvents which are not miscible with water.

Mixing pigments coated with a silicon-oxygen-matrix, in particular metallic pigments such as aluminum pigments, with non-neutralized carboxyl-functional polymers in the presence of water-miscible organic solvents in order to obtain a pigment preparation, and formulating therefrom a water-borne effect base coat by mixing with further components has not been known beforehand. It has surprisingly been found that with the pigment preparations according to the invention, it is possible to prepare water-borne effect base coats having an excellent shear stability with respect to effect and color shade constancy. In other words, water-borne effect base coats prepared with the pigment preparations according to the invention preserve their effect and color shade with an extraordinary constancy after shearing stress, such as appears for example in a circulation line.

In order to prepare water-borne effect base coats, the pigment preparations according to the invention are mixed with aqueous binders and optionally with cross-linking agents, color-imparting pigment pastes, water, organic solvents and/or additives conventionally used in coating. Additional effect-producing pigments, different from the pigments coated with a silicon-oxygen-matrix, is of course not excluded in the preparation of the water-borne effect base coats.

The water-borne effect base coats contain anionically and/or nonionically stabilized binder systems. Anionic stabilization is achieved preferably by means of at least partially neutralized carboxyl groups in the binder, whereas nonionic stabilization is achieved preferably by means of lateral and/or terminal polyethylene oxide units in the binder. Carboxyl groups are contained in the binder, for example, corresponding to an acid value of 5 to 40 mg KOH/g resin. The water-borne effect base coats may be of a physically drying nature or can be cross-linked by forming covalent bonds. The effect base coats which are cross-linking by forming covalent bonds can be self cross-linking or externally cross-linking systems. The externally cross-linking systems can be one- or multi-component water-borne effect base coats.

The binder component as well as the optionally contained cross-linking component in the water-borne effect base coats are not subjected to any limitation. Film-forming, water-soluble or water-dilutable resins, which are conventionally used in water-borne effect base coats and are known to the person skilled in the art can be used as the film-forming binders. Examples include polyester resins, (meth)acrylic copolymer resins, polyurethane resins, (meth)acrylate polyester resins and/or (meth)acrylate polyurethane resins. The (meth)acrylate polyester resins or (meth)acrylate polyurethane resins are binders in which (meth)acrylic copolymer and polyester resin or (meth)acrylic copolymer and polyurethane resin are linked together by covalent bonding and/or in the form of interpenetrating resin molecules. The preparation of the above-mentioned binders is well known to the skilled person and well reported in the literature. The water-dilutable binders may be non-functional or reactive resins having, for example, hydroxyl functions corresponding to a hydroxyl value of 20 to 140 mg KOH/g resin solids. Examples of cross-linking agents which may be contained are amine-formaldehyde condensation resins, e.g., melamine resins, and free or blocked polyisocyanates. If cross-linking agents are present, the mixing ratio of cross-linking agents to binders is preferably 10:90 to 40:60, particularly preferably 20:80 to 30:70, in each case based on the solid weight.

Examples of color-imparting pigments and fillers that may be used in the water-borne effect base coats are titanium dioxide, micronized titanium dioxide, iron oxide pigments, carbon black, silicon dioxide, barium sulfate, micronized mica, talcum, kaolin, chalk, azo-pigments, phthalocyanine pigments, quinacridone pigments, pyrrolopyrrole pigments and perylene pigments.

Color pigments and/or fillers may be ground, for example, in a part of the aqueous binder. Grinding may also preferably take place in an aqueous paste resin. Grinding may be carried out in conventional aggregates known to the skilled person. The paste may then be completed with the remaining proportion of the aqueous binder or of the aqueous paste resin to obtain the color-imparting pigment paste.

The water-borne effect base coats can further contain additives conventionally used in coating, for example in amounts of up to 5 wt-%, based on the solid content. Examples of such additives include alkaline neutralizing agents, antifoaming agents, wetting agents, adhesion promoting agents, catalysts, levelling agents, anti-crater agents, light protecting agents, cross-linked or non-cross-linked polymer microparticles, rheology influencing agents or thickeners (e.g., layered silicates, synthetic polymers having ionic groups and/or groups with an associative effect such as polyvinyl alcohol, poly(meth)acrylamide, poly(meth)acrylic acid, polyvinyl pyrrolidone and polyurethane- or polyacrylate-associative thickeners).

The organic solvent content of the water-borne effect base coats is preferably below 20 wt-%. These are solvents conventionally used in coating, and can for example result from the preparation of the binders or can be added separately. Examples of such solvents, apart from the solvents already mentioned as a component of the pigment preparations, are mono- or polyhydric alcohols which are not miscible with water, for example hexanol; glycol esters; glycols, e.g., ethylene glycol and/or propylene glycol, and their oligomers; ketones such as methyl ethyl ketone, acetone, cyclohexanone; aromatic or aliphatic hydrocarbons, for example toluene, xylene, or straight-chain or branched aliphatic C6–C12 hydrocarbons.

The water-borne effect base coats have a solid content of 10 to 35 wt-% with a weight ratio of pigment to binder of for example between 0.05:1 to 0.6:1, each based on the solid content. When calculating the ratio of pigment to binder, the sum of the proportions by weight of pigment used for effect, color pigments, and fillers is brought into relation with the solid weight contents of binder, carboxyl-functional resins contained as a component in the pigment preparation according to the invention, paste resin and cross-linking agents.

The water-borne effect base coats according to the invention are suitable for the preparation of base coat/clear coat two-layer coatings, in particular effect- and optionally color-imparting two-layer coatings in the automotive sector. The water-borne effect base coats are particularly suitable in the field of vehicle coating production lines because of the conventional use of circulation line systems. They may however also be used for example in vehicle repair coating or in the coating of plastics parts.

The water-borne effect base coats can be applied to different kinds of substrates by conventional methods. Generally, they are metallic or plastics substrates. These are often pre-coated, i.e., plastics substrates may be provided, e.g., with a plastics primer; metallic substrates generally have an electrophoretically applied primer, and optionally in addition one or more further coating layers, such as, e.g., a primer surfacer layer. Preferably the water-borne effect base coats are applied by spraying in a dry film thickness of for example 6 to 25 $\mu$m. Application takes place preferably in the wet-on-wet process, i.e., after a flash-off phase, e.g., at 20° C. to 80° C., the water-borne effect base coat layers are coated over with a conventional clear coat in a dry film thickness of preferably 30 to 60 $\mu$m and dried or cross-linked together with the latter at temperatures of, for example, 20° C. to 150° C.

Suitable clear coats are generally all known clear coats or transparent pigmented coating compositions, which can be thermally cured and/or cured by high-energy radiation, for example UV-radiation. Solvent-containing one-component- or two-component-clear coats, water-dilutable one-component- or two component-clear coats, powder clear coats or aqueous powder clear coat dispersions can be used here.

EXAMPLES

Example 1

1005 g of a straight-chain polyester (composed of adipic acid, isophthalic acid and hexanediol having a hydroxyl value of 102 mg KOH/g) were heated to 90° C. and 1.8 g of trimethylolpropane and 393 g of isophorone diisocyanate were added. The reaction was carried out at 90° C. until the NCO value was 3.8. After cooling to 60° C., a solution of 35.3 g of dimethylol propionic acid, 26.1 g triethylamine and 250 g N-methylpyrrolidone was added. After heating to 80° C., the reaction temperature was maintained until an NCO-value of 1.5 was reached. The batch was mixed with a molar amount, based on the molar NCO-content, of deionized water, and the solution was kept at 80° C., until no more NCO was detectable. The batch was then converted into an aqueous dispersion having a solid content of 35 wt-% by adding deionized water.

Example 2

1630 g 1.6-hexanediol, 455 g hexahydrophthalic acid anhydride and 608 g sebacic acid were esterified at a maximum temperature of 220° C. until an acid value of 8 mg KOHJg was reached. At 170° C., 757 g trimellitic anhydride were added and the reaction was continued until an acid value of 33 mg KOH/g was reached. After cooling to 120° C., the solid content was adjusted to 60 wt-% by adding n-butanol. The number average molecular mass of the polyester was 3400.

Example 3

1000 g of the 60 wt-% polyester resin solution obtained in Example 2 were neutralized with dimethylethanolamine and were converted into a 40 wt-% aqueous dispersion by adding deionized water. The amine content was 20 milliequivalents per 100 g solids.

Example 4

540 g butyl glycol were mixed with 560 g STAPA IL Hydrolan Nr. 54666/G8154 from the company Eckart-Werke (aluminum pigment paste with 60 wt-% aluminum pigment content in 40 wt-% isopropanol) and 100 g N-methylpyrrolidone. A pigment preparation was prepared by subsequent addition of and homogeneous mixing with 400 g of the 60 wt-% polyester resin solution of Example 2.

Example 5 (Comparative example)

340 g butyl glycol were mixed with 560 g STAPA IL Hydrolan Nr. 54666/G8154 from the company Eckart-Werke and 100 g N-methylpyrrolidone. A pigment preparation was prepared by subsequent addition of and homogeneous mixing with 600 g of the 40 wt-% aqueous polyester resin dispersion of Example 3.

Example 6

A water-borne metallic effect base coat was prepared by mixing the following components:

- 1600 g of the pigment preparation of Example 4,
- 2000 g of a 40 wt-% aqueous binder dispersion according to Example 4 of U.S. Pat. No. 4,981,885,
- 1400 g of the polyurethane dispersion of Example 1,
- 2500 g deionized water,
- 500 g hexamethoxymethyl melamine,
- 700 g butyl glycol,
- 300 g n-butanol,
- 1000 g Viscalex® HV 30 from the company Allied Colloids (polyacrylic acid thickener, adjusted to a pH of 7.5 with dimethylethanolamine, solid content 10 wt-%).

The pH-value was adjusted to 8.5 with dimethylethanolamine.

One half of the water-borne metallic effect base coat was subjected to a shearing strain, by forcing the material twice, each time completely, through the Homogenizer HC5000 from the company Microfluidics International Corporation (forced conveyance, system pressure 60 bar, chosen narrowing: interaction chamber in Z-format with a diameter of 300 μm).

Example 7 (Comparative Example)

Example 6 was repeated except that (1) the pigment preparation of Example 5 was used instead of the pigment preparation of Example 4; (2) 2300 g deionized water were used instead of 2500 g deionized water; and (3) 900 g butyl glycol were used instead of 700 g butyl glycol.

Both the sheared and the non-sheared water-borne metallic effect base coats of Examples 6 and 7 were each applied to a conventional phosphated auto body sheet pre-coated by cathodic electrodeposition coating and with primer surfacer by spraying in a dry film thickness of 12 μm. The coating was pre-dried for 5 minutes at 80° C. It was then coated over with a conventional two-component polyurethane clear coat in a dry film thickness of 35 μm and baked for 20 minutes at 140° C. (object temperature).

The lightness L* (CIELAB-system) of the thus obtained total of four test coatings was measured for each from an observation angle of 15° and of 110° with respect to the gloss angle. The alteration of the lightness difference $[(L^*_{15}-L^*_{110})_{non-sheared}-(L^*_{15}-L^*_{110})_{sheared}]$ which is conditional on the shearing was then determined from the measured values. In this way, a value of −2.1 was determined for the two-layer coatings obtained with the sheared and non-sheared water-borne metallic effect base coats of Example 6. The corresponding determining of the two-layer coatings obtained with the water-borne metallic effect base coats of Comparative Example 7 resulted in a value of −6.3.

What is claimed is:

1. An aqueous pigment preparation having a solids content of 10 to 60 wt-% and comprising:
    a) pigments coated with a silicon-oxygen-matrix;
    b) at least one carboxyl-functional resin having non-neutralized carboxyl groups sufficient to produce an acid value of 10 to 100 mg KOH/g resin and having a number average molecular mass of 500 to 5000, wherein the weight ratio of pigment to resin is in the range of 1:0.3 to 1:10;
    c) at least one water-miscible organic solvent; and
    d) water wherein the water content is up to 10% based on the amount of water-miscible solvents.

2. The aqueous pigment preparation according to claim 1, wherein the pigments coated with a silicon-oxygen-matrix are aluminum pigments.

3. The aqueous pigment preparation according to claim 1, wherein the weight ratio of pigments to resin is in the range of 1:0.5 to 1:3.

4. The aqueous pigment preparation according to claim 1, wherein the acid value of the resin is 20 to 50 mg KOH/g resin.

5. The aqueous pigment preparation according to claim 1, wherein a polymer is bonded to the silicon-oxygen-matrix of the pigment.

6. A process for preparing a pigment preparation comprising the step of mixing together, in any order,
    a) pigments coated with a silicon-oxygen-matrix;
    b) at least one water-miscible organic solvent;
    c) at least one carboxyl-functional resin having non-neutralized carboxyl groups sufficient to produce an acid value of 10 to 100 mg KOH/g resin and having a number average molecular mass of 500 to 5000, wherein the weight ratio of pigment to resin is in the range of 1:0.3 to 1:10; and
    d) water In an amount up to 10% based on the amount of water-miscible solvents;
wherein the pigment preparation has a solids content of 10 to 60 wt-%, and is a homogeneous mixture.

7. A water-borne effect base coat composition comprising:
    a) a pigment preparation having a solids content of 10 to 60 wt-% prepared by mixing together, in the presence of, a water content of up to 10% based on the amount of water-miscible solvents, at least one organic, water-miscible solvent, pigments having a surface coating of a silicon-oxygen-matrix with at least one carboxyl-functional resin having non-neutralized carboxyl groups sufficient to produce an acid value of 10 to 100 mg KOH/g resin and having a number average molecular mass of 500 to 5000, wherein the weight ratio of pigment to resin is in the range of 1:0.3 to 1:10, and at least one aqueous binder; and
    b) optionally containing components selected from the group consisting of cross-linking agents, color-imparting pigment pastes, water, organic solvents, fillers, rheology control agents, thickeners, alkaline neutralizing agents, antifoaming agents, wetting agents, adhesion promoting agents, catalysts, leveling agents, anti-crater agents, light protecting agents and polymer microparticles.

8. A process of applying a multi-layer coating on an article, said process comprising the steps of:
    (a) applying the base coat according to claim 7 on said article; and
    (b) applying a clear coat composition over said base coat.

9. The process of claim 8, wherein the article is selected from the group consisting of vehicle bodies and parts therefore.

* * * * *